2,807,857

PRODUCTION OF THORIA WARE

Peter Murray, Abingdon, Ivor Edison Denton, Chilton, and Donald Wilkinson, Nelson, England, assignors to National Research Development Corporation, London, England No Drawing. Application September 24, 1954, Serial No. 458,251

7 Claims. (Cl. 25—156)

This invention relates to the production of thoria ware for example crucibles of thoria.

Thoria crucibles available commercially usually have low densities, for example from 5.8 to 7.3 gm. per cc., and appreciable porosities with a large amount of open pores and such crucibles have been found to give rise to difficulties in metallurgical experiments owing to penetration of molten metals through the crucibles.

The object of the invention is to provide a method of producing ware of very low or substantially zero porosity involving the slip casting of pure thoria avoiding the use of additional refractory materials or flux.

The invention consists of a method of producing slip-cast thoria ware which comprises calcining thoria of a purity of at least 99.5 percent at a temperature substantially above 1000° C., and preferably at about 1700° C., dry milling the calcined thoria to produce a product having particle sizes ranging up to 11 microns and having substantially 60 percent of particles less than 2 microns, forming the thoria into an aqueous slip, casting the slip and firing the dry cast at a sintering temperature, preferably of from 1600° C. to at least 1825° C. The aqueous slip for casting is preferably of pH about 1 to 3.5.

If the dried casts are to be fired in a furnace with a relative high rate of heating, for example 400° C. per hour, it is desirable to presinter the casts at about 1350° C., since cracking of the dried casts has been found to take place when the temperature is raised relatively quickly to 1600° or to 1825° C. Final sintering may then be effected at, for example, 1650° C. for 30 minutes or at 1825° C. or higher for 5 minutes.

Milling of the calcined thoria is preferably effected in a ball mill lined with rubber employing steel balls. In this way a milled product contained only 0.3 to 0.5 percent of iron has been obtained, and the contamination may be largely removed by leaching it with an aqueous strong mineral acid which is chemically inert towards the thoria. The acid is preferably 6N hydrochloric acid.

The preferred composition of the slip is 1600 grams of thoria in each litre of slip, that is a volume ratio of thoria to water of 1 to 3.55. The preferred pH of the slip is 1. Such slips have been found to be suitable for casting even after six weeks from the time of their preparation, when thoria of 99.9 percent purity was used.

Example

The following is a preferred way of carrying the invention into effect.

Thoria of 99.9 percent purity, the major impurity being 0.07 percent titania was calcined at 1700° C. for 30 minutes in alumina saggars in a gas-oxygen furnace that is a furnace heated by coal gas burning in oxygen. After being broken down the calcined thoria was milled dry in a rubber lined mill for 50 hours using steel balls, the ratio of thoria to ball charge being 4:1. The milled thoria was leached with cold 6N hydrochloric acid. At this stage the pH of the thoria slip was 0.3 to 0.5. The thoria was washed, water was added to give a composition containing 1600 grams of thoria to each litre of slurry and the pH was adjusted to 1.0 to form a slip of the consistency desired for casting thin walled crucibles. Crucibles were cast in plaster of Paris moulds. After drying the casts were pre-sintered in 1350° C. in a Globar furnace that is a furnace heated by radiant electrically heated resistances. Final sintering treatments were then given in a gas-oxygen furnace referred to above. One batch were so sintered at 1650° C. for 30 minutes and another batch were sintered at 1825° C. Of these batches the dried casts had a bulk density of 6.90 gm. per cc. and the final bulk densities after sintering were 9.07 gm. per cc. for the first batch and 9.64 gm. per cc. for the second batch. The linear shrinkages were 8.02 percent and 9.47 percent respectively. Crucibles of the first batch had 0.5 percent open pores and 5.8 percent closed pores, whereas those of the second batch had no open pores and only 0.4 percent closed pores. The latter crucibles were translucent.

While a gas-oxygen furnace is mentioned in the example, it will be understood that other furnaces capable of giving the temperatures specified may be employed.

Specimen commercial thoria crucibles examined were found to have a bulk density of 6.91 gm. per. cc. They were given a sintering treatment at 1825° for 5 minutes and were found to have a bulk density of 7.59 gm. per cc. and open pores to the extent of 22.8 percent. Thus in the case of the commercial products it is believed that the particle sizes are such that the forces operating in the sintering process are insufficient for sintering to proceed to the closed pore stage.

We claim:

1. A method of producing slip-cast thoria ware characterised in that thoria of purity at least 99.5 percent is calcined at a temperature above 1000° C., the calcined thoria is milled to produce a product having particle sizes ranging up to 11 microns and having substantially 60 percent of particles less than 2 microns, the milled thoria is formed into an aqueous slip which is cast and the dry cast is fired at a sintering temperature of the thoria.

2. A method according to claim 1 characterized in that the dry cast is fired at a temperatue of from 1600° C. to at least 1825° C.

3. A method according to claim 1 characterized in that the thoria is calcined at a temperature in the neighbourhood of 1700° C.

4. A method according to claim 1, characterised in that the aqueous thoria slip has a pH of 1 to 3.5.

5. A method according to claim 1, characterised in that the dry cast is pre-sintered at a temperature in the neighbourhood of 1350° C.

6. A method according to claim 1 wherein the thoria slip has a volume ratio of thoria to water of 1 to 3.5.

7. A method of producing slip-cast thoria ware of very low pore content, which method consists in the steps of calcining thoria of a purity of at least 99.5 percent at a temperature above 1000° C., milling the calcined thoria to produce a product having particle sizes ranging up to 11 microns and having substantially 60 percent of particles less than 2 microns, forming the milled thoria into an aqueous slip, casting the slip in a mold and firing the dried cast at a sintering temperature of the thoria.

References Cited in the file of this patent

UNITED STATES PATENTS

| | | |
|---|---|---|
| 1,121,889 | Arnold | Dec. 22, 1914 |
| 1,554,225 | Marden | Sept. 22, 1925 |